United States Patent [19]
Kochem

[11] 4,024,345
[45] May 17, 1977

[54] AUDIO PROGRAM AND TELEPHONIC COMMUNICATION SYSTEM

[75] Inventor: Robert Clark Kochem, Attleboro, Mass.

[73] Assignee: Strom Industries International, Inc., Newton, Mass.

[22] Filed: Jan. 14, 1976

[21] Appl. No.: 648,945

[52] U.S. Cl. .............................. 179/1 B; 179/1 H
[51] Int. Cl.² ...................................... H04M 11/08
[58] Field of Search ............ 179/1 B, 1 H, 18 AD, 179/15 A, 15 AT, 37–40, 81 B, 99, 15 AL

[56] References Cited
UNITED STATES PATENTS

| | | | |
|---|---|---|---|
| 3,566,038 | 2/1971 | Slavin | 179/1 B |
| 3,585,307 | 6/1971 | Greenberg | 179/1 B |
| 3,757,053 | 9/1973 | Pell et al. | 179/1 H |

OTHER PUBLICATIONS

Audio, (May, 1970), "15 Channels on One Pair of Wires", pp. 20–24, C. G. McProud Primary Examiner—Kathleen H. Claffy
Assistant Examiner—Gerald L. Brigance
Attorney, Agent, or Firm—William Nitkin

[57] ABSTRACT

A system for the selective distribution of audio programs and telephone functions between different locations having the capability through time sharing means to handle multiple simultaneous audio programs and private telephone communications independently. The system employs a timesharing system utilizing analog sampling and data transmission where the transmission of sampled digitized and analog data is only over short cable lengths. The system includes a plurality of telephones and a plurality of receiver stations, the telephone being interconnected through telephone control circuitry to a central processing unit and the receiver stations being interconnected through room selector units to the central processing unit and to audio sources.

14 Claims, 7 Drawing Figures

RECEIVER STATION

FIG. 3 ROOM SELECTOR UNIT

CENTRAL PROCESSING UNIT AND TELEPHONE CONTROL CIRCUITS

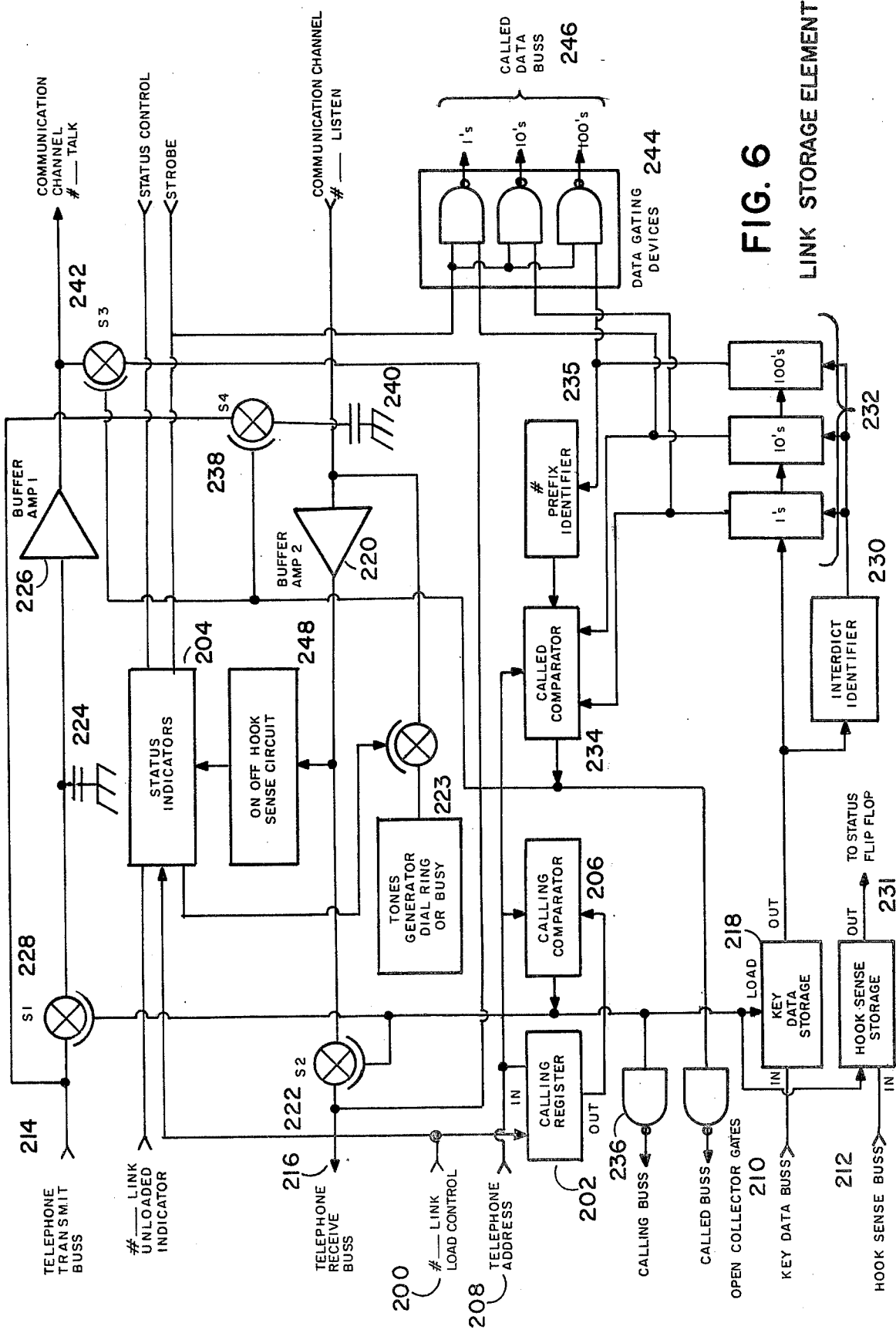
FIG. 6 LINK STORAGE ELEMENT

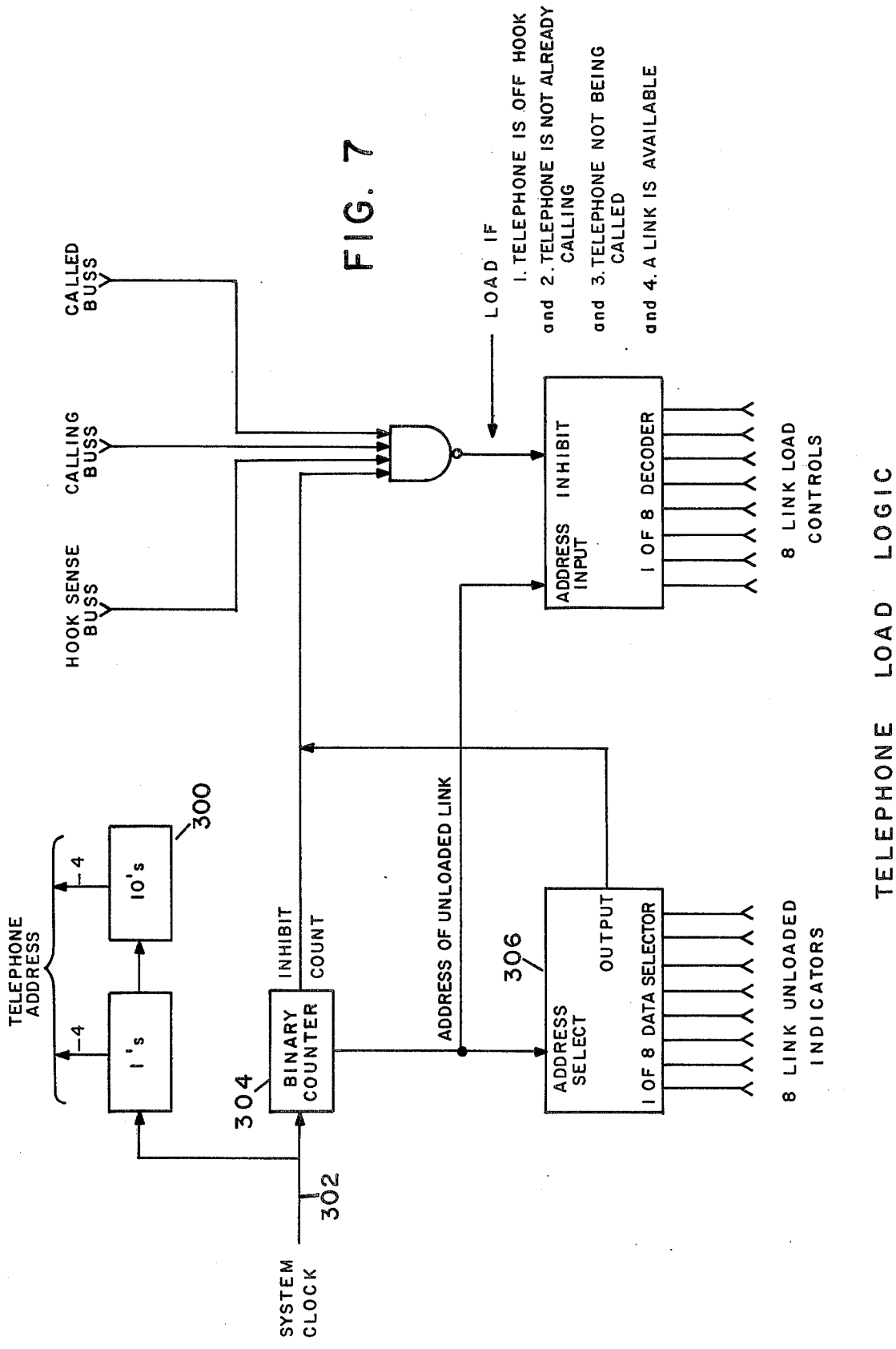

AUDIO PROGRAM AND TELEPHONIC COMMUNICATION SYSTEM

BACKGROUND OF THE INVENTION

1. Field of the Invention

The device of this invention resides in the field of distribution of audio programs and telephone communication between a number of locations utilizing a time sharing system.

2. Description of the Prior Art

The device of this invention is a new and improved system relating to the distribution of selected audio programs and telephone communication to various locations such as is utilized in schools, offices, nursing homes and other establishments where such communication systems are necessary. The present art is clearly illustrated in school classroom situations where there is a loudspeaker located within each classroom through which the school administrator can make daily or random announcements to each room independently while sending other programs or announcements to other rooms at the same time. In many instances music is played into various rooms and the administrator has a plurality of channels available through which different audio programs can be sent to individual rooms. Further included within these communication systems is a telephone network by which an administrator can buzz a room and an instructor or other person will lift a handset and be able to speak back and forth to the caller. These audio telephone distribution systems have been in use for many years and employ electromechanical and other well-known art in their structure. The systems are comprised of a number of audio sources such as AM and FM tuners, tape decks, and microphones for vocal communication. These audio sources are connected to a series of audio power amplifiers which may be selectively connected to the loudspeaker station located in a room by means of a bank of multiple position switches which complete the contact to that loudspeaker station. Most often a two-wire balanced system with two-pole switch is used. The power amplifiers utilized in this older system customarily employ an output transformer delivering a 70 - 25 volt RMS output maxium. Therefore a stepdown transformer is usually required at the loudspeaker station within the classroom. Volume control is achieved by utilizing different voltage taps on the stepdown transformer. Utilized with the loudspeaker system is a basic telephone network capable of multiple simultaneous conversations. Each simultaneous conversation requires a common wiring buss. To interconnect two telephones for a conversation, contact must be closed to the same link. Therefore, in order to have more than one simultaneous conversation, additional busses must be available for each simultaneous conversation, so that this older system has the number of possible simultaneous conversations limited by the number of busses within the network. The switches within such a telephone system are usually very low impedance contact relays, electro-mechanical devices or solid state approximation of relays. Closure of the relays, decoding of dial information and associated functions are usually performed by a control unit which in older units is mechanical and in newer units is of a solid state construction. The obvious disadvantage of the above system is that the amount of hardware required increases in proportion to the number of telephone links. As a rule the number of relay points equals the number of telephone stations times the number of links. A further disadvantage is that each telephone station requires its own set of contact wires for each link which increases both the cost of the control unit and the difficulty of installation. In the present art, when inteconnecting an audio distribution system with a telephone system, relays or mechanical devices must be employed to disconnect the loudspeaker station from its normal program connection and connect it to the appropriate telephone link. A disadvantage to this interfacing of a telephone system with a loudspeaker address system is that means for an individual at the loudspeaker station to communicate back to the originating telephone unit are limited. This disadvantage is partially solved by utilizing a talk-listen switch of either manual or voice activated types which employs the loudspeaker alternatively between duty as a loudspeaker and microphone.

There is a significant economic factor involved with the system utilizing the present art since the audio power signals are being switched many times. Expensive low impedance devices such as relays must be employed to perform all switching functions and there must be at least one set of switching devices for each station utilized within the telephone and loudspeaker stations and multiple switches are required if multiple simultaneous conversations are to take place. In recent years alternative systems have been designed wherein a minimum amount of hardware is utilized, but the hardware is "time shared" between several communications paths. The result is that one set of hardware is employed to handle all communications and audio programs as opposed to having a separate set of hardware available for each conversation. A time sharing system such as described above may include a master control unit which receives a series of audio program inputs which are sampled at discrete intervals of time and transmitted in digital format with address information including the intended receiver of the audio signal. At each receiving station is a local control unit which decodes the address information and, if it perceives that it is the address to which the information is directed, it will accept the digitized audio information. This digitized audio information is then reconstructed into its original analog format and amplified to a suitable power level. The local control units may also contain elements capable of formatting and transmitting audio call back information from the loudspeaker station. This system can be expanded to include telephone-serviced stations and provide other functions associated with telephone/audio distribution systems. There are several problems associated with these communication systems. Firstly, the sampled data audio system requires a theoretical minimum sampling rate of 6,000 samples per second per receiving station. With the inclusion of time allocated to control functions, systems requiring even a relatively small number of stations have operating rates approaching several megahertz. This high data rate presents problems in the transmission lines and in the design of the various control units. If the rate of sampling is lower than 6,000 samples/second, the sound quality is poor. These high sampling rates automatically prohibit the use of mechanical switching means, and solid state means must be employed. It is also difficult to transmit signals of this frequency range over long cable distances due to capacitive effects which degrade the signal quality. A further disadvantage is that spurious noise signals from other electrical sources may be picked up by the transmission line if such sources are anywhere on or near the line. A further disadvantage is that the control unit for each station is quite complicated and makes the cost of systems with even a low number of stations very high. The result of the above problems is usually the restriction of uses of such time sharing systems to smaller applications where the ease of wiring is a dominant factor.

SUMMARY

The communication system which is the subject of this invention is utilized for the distribution of multiple simultaneous audio programs and/or telephone conversations. It employs a time sharing system utilizing analog sampling and data transmission as opposed to purely digital methods and encompasses further advantages in that the transmission of sampled digitized and analog data is only over short cable lengths. The system has advantages in that the number of loudspeaker telephone stations may be increased to a substantial number without altering the system's low operating frequency and without adding to the previously existing wiring. A further object of this invention is to provide a system wherein the telephone and loudspeaker station sub-systems may be operated independently of one another but yet provide all normal telephone and program distribution functions.

The present invention consists of an apparatus for simultaneously carrying a plurality of audio signals over a transmission line between a central location and a plurality of remote locations using an address line intercoupling the central location and at least one selecting means associated with a plurality of remote locations for carrying digital address signals for designating respective remote locations to exchange audio signals with the transmission line. Each of the remote locations has remote transceiving means coupled to the transmission line through an associated selecting means that include means responsive to a predetermined digital address signal on the address line for enabling a designated remote location transceiving means to exchange audio signals with the transmission line. Also, each of the remote transceiving means includes remote transducing means for transducing acoustical and electric energy from one form to the other, remote analog storage means for storing an electrical analog siganl, means for selectively coupling the remote analog storage means to the transmission line, and means for coupling the remote analog storage means to the remote transducing means. A control unit coupled to the address line has designating means for designating predetermined ones of the remote transceiving means to be enabled during predetermined time interval sets which correspond to respective time-spaced communication channels to provide designating digital address signals on the address line and means for enabling a remote transceiving means during time intervals corresponding to a set for exchanging intelligible audio signals between the remote transducing means associated with the enabled transceiving means and the transmission line.

A more detailed embodiment of the present invention consists of a series of receiver stations located in areas such as school classrooms which are composed of a loudspeaker and/or telephone combination and are to receive one of several audio inputs from a central source or to be connected to a telephone conversation with either the central source or other receiver station. In a typical receiver station the voltage and ground are supplied by either a centrally located power supply or a power supply located at or near the receiver station. At a receiver station a local power amplifier takes the low level audio signals coming from a Room Selector Unit and boosts those signals to a sufficient power level for audibility. Within the receiver station there may also be a microphone to be utilized for call back functions as a telephone. The receiver stations may have a variety of structures and can utilize, for example, an optional talk/listen switch, a "call-in" switch or may have a separate hand set and hook switch which is utilized to provide hand set/speaker operation.

As it is contemplated in this invention, the audio output signal lines to the receiver stations will carry low frequency signal levels and there is no problem in locating the receiver station at a long distance from its associated Room Selector Unit. In one embodiment illustrated, the receiver stations are connected in groups of twenty per Room Selector Unit. The Room Selector Unit performs the function of connecting selected signals or telephone conversations to each receiver station, such selection being achieved by a switch panel containing a series of multiple position switches. These switches or similar devices are manually operated by an attendant to direct a desired program to a specific receiver station. The Room Selector Unit connects audio signals from a plurality of input communication channels to a series of receiver stations by means of a common room listen buss and a common room talk buss over which the data is multiplexed Each communications channel consists of one analog line carrying audio signals to be sent and a second analog line carrying audio signals from the receiver station microphone to the central location where the Room Selector Unit is located. These two lines allow simultaneous talk and listen functions during telephone-to-room conversations and omit the need for a talk/listen switch. Some of the input communication channels are used for audio programs such as those derived from AM and FM tuners, special tape program inputs and telephone-to-telephone communications. Within the Room Selector Unit for each receiver station is a solid state room switch, a storage element such as a capacitor, a low pass filter, and a small preamplifier stage. In practice a controllogic element located within the Room Selector Unit scans each of the receiver station circuits. The control logic makes the decision on the closure of switches based on inputs from digital address lines related to telephone calls and from the manually operated program selection panel which it periodically scans and which supplies the receiver station address for each input conmunication channel. When the control logic gets to a specific receiver station which is indicated to receive a particular program, the associated solid state room switch is biased "on". The control logic then closes the solid state channel switch of the audio line which the receiver station should be receiving. The instantaneous voltage on the audio line is then transferred to the storage element. The switches are then opened and the control logic proceeds to the next receiver station. After all receiver stations have been processed, the control logic returns to the first receiver station and restarts the cycle. In between these "samples," each storage element located retains the last sampled voltage. Provided that the sampling rate is in accordance with the theoretical rates imposed by Nyquist sampling theory and Fourier analysis, the sample/hold/low pass filter and preamplifier will serve to provide an accurate representation of the audio signals at the preamplifier outputs. The storage elements are each followed by a low pass filter and preamplifying means in order to filter out unwanted harmonics. A sampling rate of 500 KC or 25 KC per receiver station has been found to be sufficient to yield good audio results and is easily within the physical ability of the hardware utilized. A second set of switches and a room talk buss to provide a talk back path from the receiver station may be provided utilizing the same control logic. This embodiment employing separate talk and listen lines has advantages over the present conventional systems which utilize only a single line and require a talk/listen switch or similar device.

At the heart of the system is the Central Processing Unit from which series of digital room address lines indicate to the Room Selector Unit the identifying numbers of any receiver station being called by a telephone. The Room Selector Unit located in a central location monitors this information and should any of its associated receiver stations be called, the Room Selector Unit disconnects that receiver station from its audio program and reconnects it to a room telephone audio line. At the end of the call the receiver station is connected back to its selected audio program.

The Central Processing Unit controls all telephone-to-telephone and telephone-to-receiver station connections. Telephone-to-telephone conversations are achieved within the Central Processing Unit using a time multiplexing process. Telephone-to-receiver station conversations are achieved by indicating on digital address lines which receiver stations are to be connnected to room-to-telephone audio lines and thereby connect into the multiplexing system within the Central Processing Unit.

When utilizing this invention for telephone conversations, the Central Processing Unit's control logic sequentially scans all telephones in the system by means of telephone digital control lines which indicate the identifying number of the telephone being interrogated. When it reaches a telephone engaged in a conversation, the analog information which has been sent to and stored within that telephone's control circuitry card located at or in close proximity to the Central Processing Unit is then connected through a solid state switch onto a common audio line. A solid state link switch then loads this information into a link storage element within the Central Processing Unit. The control unit scans further until it reaches the telephone control circuitry card of the second telephone engaged in the conversation and loads its digitized output into the same link storage element, thereby completing the conversation. When the scanning has completed all telephones, the cycle restarts. During the scanning, only those telephones involved in conversations are interrogated for analog sampled data which allows for a more efficient sampling rate. Since one link storage element is used to handle the information for two telephones engaged in simultaneous conversation together, it is only necessary to add an inexpensive link storage element with no additional wiring to increase the number of possible simultaneous conversations.

It should be noted that the control logic is an intergrated circuit type and that the sign of the Central Processing Unit can provide all normal telephone functions including interface with the Bell System equipment. A key point of this invention is that the telephone control circuitry cards are located near the Central Processing Unit so that the transmission of high frequency and analog sampled data is only over a short distance and there is no difficulty in locating the telephones at long distances from the Central Processing Unit because the output of the telephone control circuitry cards is of the low frequency audio type, thus the transmission difficulties encountered in other time sharing systems are eliminated. The apparatus of this invention also allows the Room Sellector Unit to operate independently of the Central Processing Unit and telephone control circuitry cards.

BRIEF DESCRIPTION OF THE DRAWINGS

FIG. 6 is a schematic diagram in block format illustrating a link storage element.

FIG. 7 is a schematic diagram in block format illustrating the telephone load logic.

DESCRIPTION OF THE PREFERRED EMBODIMENT

Figure 1:
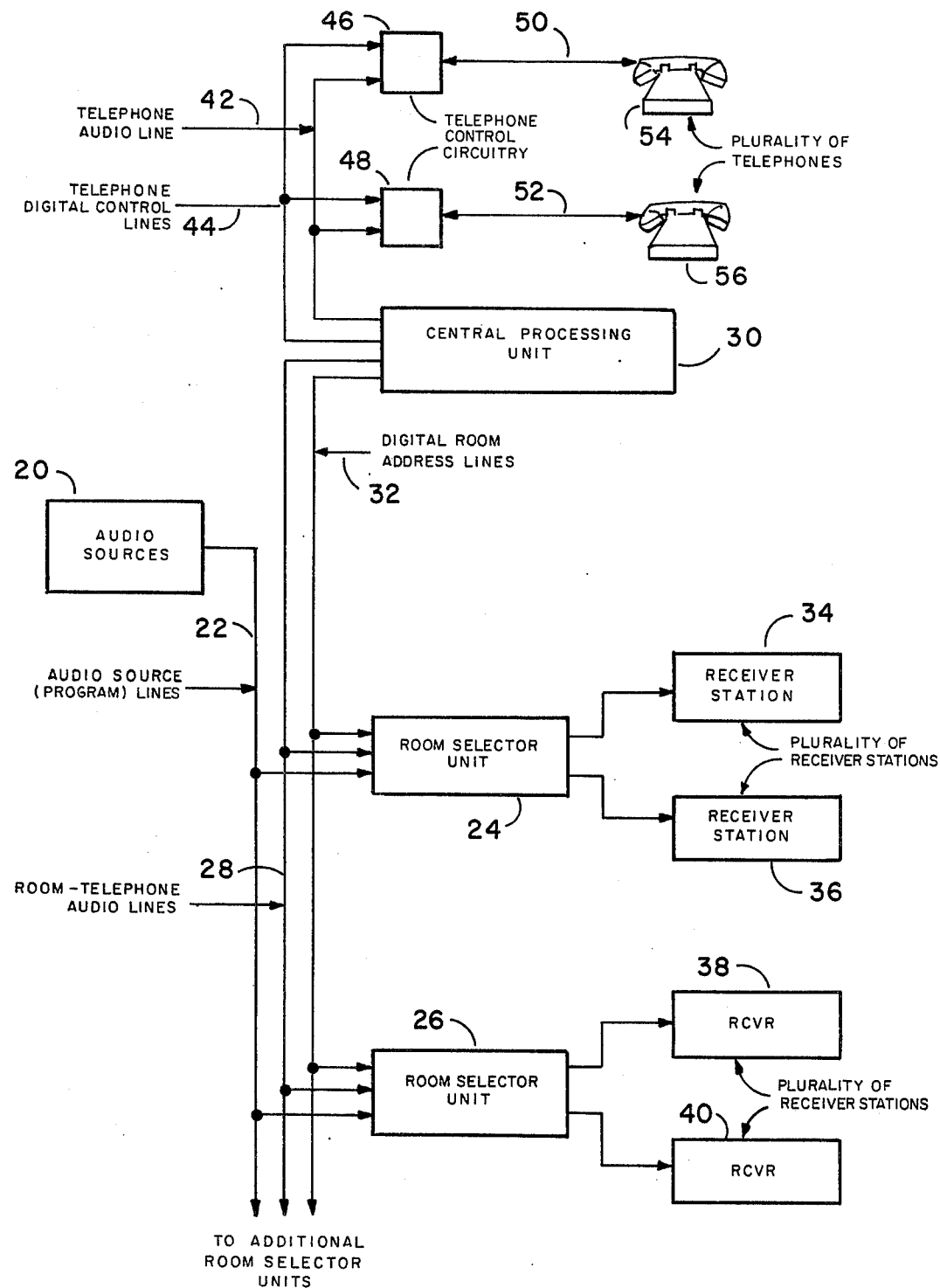
FIG. 1 is a schematic diagram in block format illustrating the system of the invention.

FIG. 1 is a schematic diagram in block format illustrating the basic system of the invention. Audio sources 20 are shown connected by audio source program lines 22 to Room Selector Units 24 and 26 which may be part of a series of Room Selector Units. In practice, with more than one audio source there will be an equal number of audio source program lines, one emanating from each such source. Also communicating into the Room Selector Units are room telephone audio lines 28 running from Central Processing Unit 30. Also coming from the Central Processing Unit to the Room Selector Units are digital room address lines 32. Each Room Selector Unit is connected to a series of receiver stations, some of which are indicated by 34, 36, 38, and 40. Also communicating with the Central Processing Unit are telephone audio lines 42 and telephone digital control lines 44. These lines run from the Central Processing Unit to telephone control circuits, some of which are illustrated by 46 and 48. In turn, these circuits are connected by telephone communication lines 50 and 52 and by other lines to a plurality of telephones, two of which are illustrated here by 54 and 56. Receiver stations 34, 36 38 and 40 are located in places such as school classrooms and are to receive one of several audio programs from audio sources 20 or to be connected with a telephone conversation. The receiver station in one embodiment may be arranged in groups of twenty with an associated Room Selector Unit as shown by 24 or 26 which performs the function of connecting the audio sources 20 or the telephone conversation, through room telephone audio sources 20, to each receiver station. Under normal operation Room Selector Unit 24 connects a selected audio program to each of its associated receiver stations. Such selection may be manually indicated on a multiple switch position bank within each Room Selector Unit manipulated by an attendant using the panel of selector switches. Digital room address lines 32 from Central Processing Unit 30 indicate the identifying numbers of any receiver station being called by a telephone. The Room Selector Unit monitors this information and should any of its receiver stations be called, the Room Selector Unit would disconnect that receiver station from its audio source and reconnect it to a room-to-telephone audio line 28. At the end of the telephone conversation, the receiver station would be connected back to its selected audio program through line 22 of the group of audio source program lines. Central Processing Unit 30 controls all telephone-to-receiver station connections. Telephone-to-telephone conversations are achieved using a time multiplexing process. Telephone-to-receiver station conversations are achieved by digital room address lines 32 and room telephone audio lines 28 which interconnect Central Processing Unit 30 and the Room Selector Units, two of which are illustrated by 24 and 26. The basic parts of this system having been illustrated, the following diagrams and description will serve to describe more fully in detail each of the associated members forming the entire system.

Figure 2:
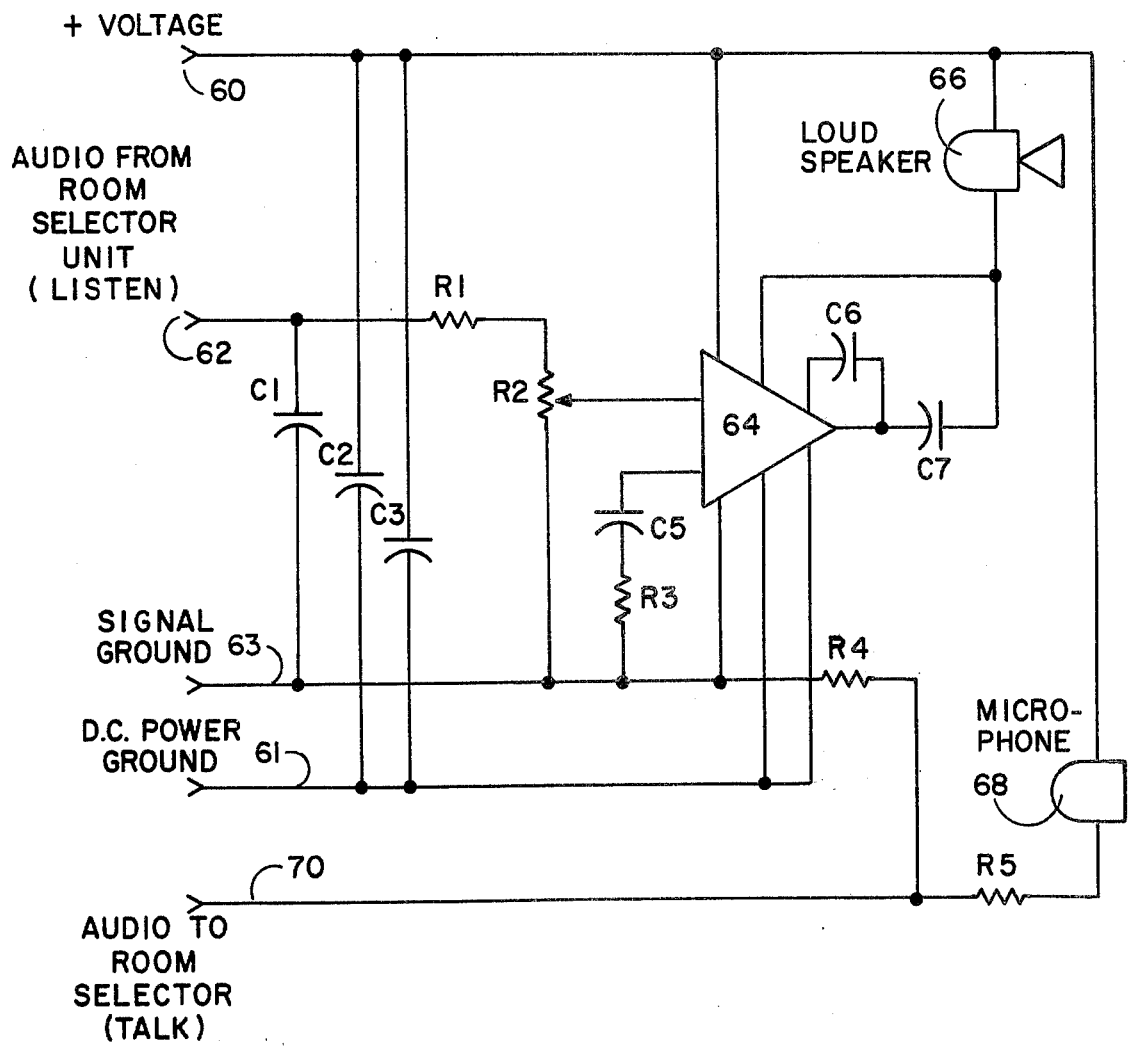
FIG. 2 is a schematic diagram of a typical receiver station.

FIG. 2 illustrates a diagram of a typical basic receiver station which is located usually within a classroom or other room where such a communication system is desired. Positive voltage 60 and D.C. power ground 61 are supplied by a power supply which may be located at the location of the receiver station or at a central location, such as near the receiver station's associated Room Selector Unit. A low level audio signal is sent to the receiver station from the Room Selector Unit along line 62 and signal ground 63. The signal is amplified by power amplifier circuit 64 which may be an SGS-ATES TBA-820 or equivalent. The amplification is to a sufficent level to drive loudspeaker 66 or other equivalent voice output means. Microphone 68 or similar device may be used to provide means for an individual to talk back during a telephone conversation by sending audio signals back to the Room Selector Unit. These audio signals would pass back to the Roon Selector Unit along line 70. Since the audio signal lines to the receiver station carry audio frequency low level signals, there is no difficulty in locating the receiver station at relatively long distances from its associated Room Selector Unit. Capacitors C1 through C7 and resistors R1 through R5 or their equivalents are the necessary components to assure proper operation of the amplifier loudspeaker and microphone and may be determined by consulting specifications which the manufacturer presents on the amplifier and/or microphone.

Figure 3:
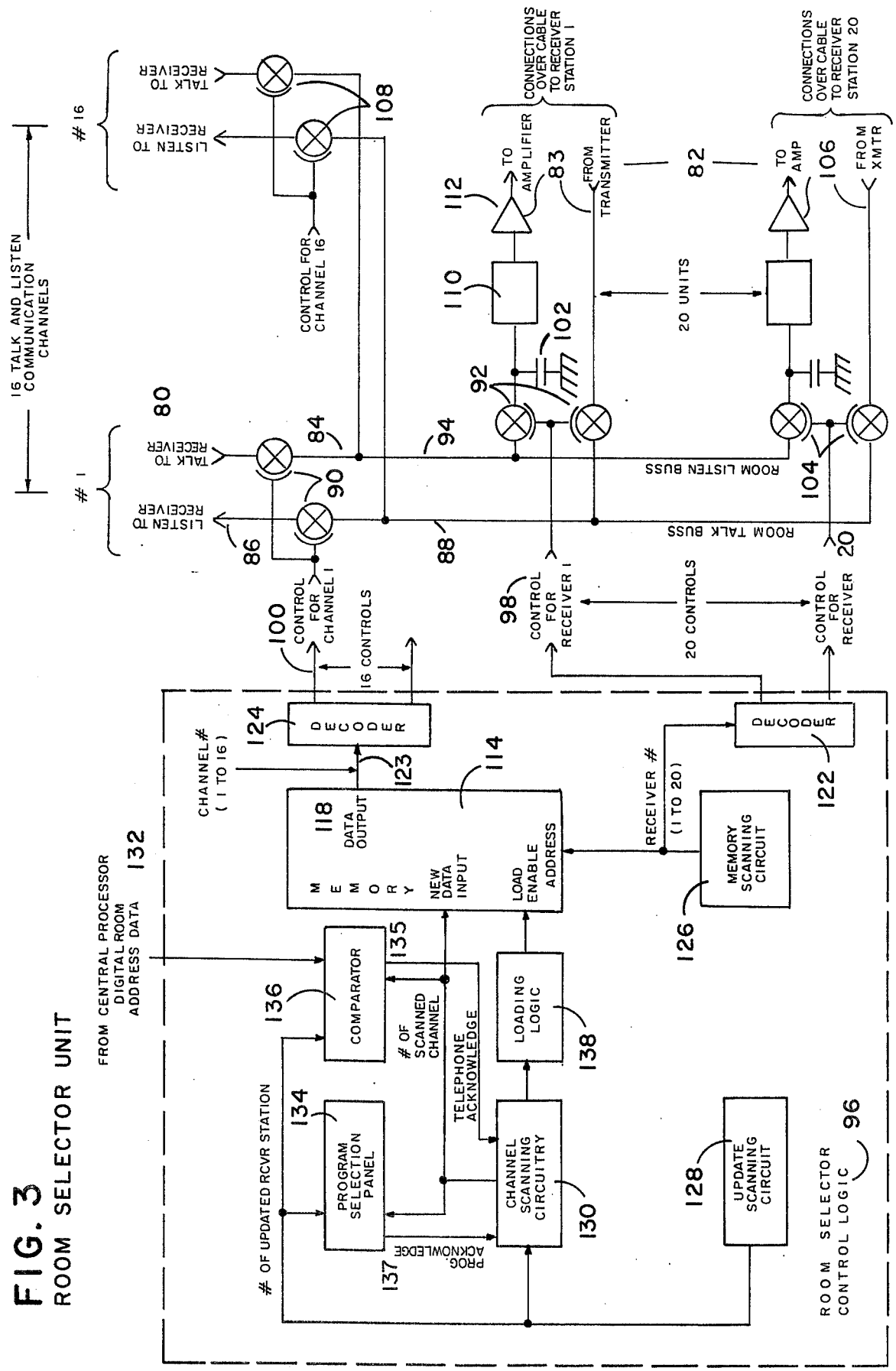
FIG. 3 is a schematic diagram in block format illustrating a Room Selector Unit.

FIG. 3 illustrates a typical schematic of a Room Selector Unit. The Room Selector Unit connects the audio signals from the communication channels to the receiver station. In the embodiment illustrated, there are sixteen communication channels 80 which are interconnected to twenty receiver stations, the series of which are indicated at 82. Referring to one communication channel for ease of illustration, that channel consists of one analog line 84 carrying audio signals to be sent to the receiver station and a second analog line 86 carrying audio signals from the receiver station's microphone. These lines allow for a simultaneous talk and listen function during a telephone-to-room conversation and omit the need for a talk/listen switch. In the embodiment as illustrated where there are sixteen input channels 80, one can utilize a portion of those channels for general purpose audio program inputs such as AM-FM tuners, tape programs, etc., and one can utilize the remaining portion of those input channels for telephone-to-room communications. The connection of the communication channels 80 to receiver stations 82 is achieved by using a time sharing or multiplexing approach as described below. Each communication channel 80 can be connected to room-talk buss 88 and room listen buss 94 by gating on an associated pair of solid state switches 90. These swiches are of the CMOS quadbilateral type and Texas Instrument's type TP4016A or equivalent. Similarly receiver station connections 82 each have a pair of solid state switches 92 which allow the receiver station's audio input and audio output to be connected to room listen buss 94 and room talk buss 88, respectively. The audio input must pass through a sample and hold circuit first and this process is explained below. A Room Selector Unit control logic 96 activates pairs of on-off gates illustrated by 90 and 108 by means of a series of control lines, one of which is indicated by 98 for the receiver stations and a series of control lines, one of which is indicated by 100 for the communication channels. The receiver station connections 83 for receiver station No. 1 is initially connected to talk and listen busses by gating on switches 92. The control logic determines which of the communication channels is to be connected to that receiver station and gates on the two solid state switches for that channel which are indicated by 90 in Communication Channel No. 1. In this manner the communication channel and the receiver stations are directly wired together as long as the switches are biased "on". Storage capacitor 102 will charge to the voltage on the room listen buss. Both pairs of switches 92 and 90 are now opened, the capacitor 102 retaining its initially charged voltage. The control logic then using the next receiver station in sequence, for sake of illustration reference is made to receiver station No. 20, gates on switches 104 and the control logic also gates on switches 108 on the other communication channel illustrated assuming that is the one to which the receiver station is to be connected. It should be understood that there is a plurality of channels possible between the two illustrated. The procedure proceeds sequentially until all the receiver stations have been connected to their respective communication channels for a brief period of time. The control logic then returns to receiver station 1, shown by 83, and the cycle repeats. As long as the cycling rate is fast enough, as discussed above, the signal level seen at the inputs and outputs for each receiver station and communication channel will appear to be of a continuous nature. Storage capacitor 102 is followed by lowpass filter 110 and preamplifying means 112 which is for filtering out unwanted harmonics and forms a sample and hold filter. In the embodiment illustrated 0.0015UFD storage capacitor or equivalent may be used and the lowpass filer and preamplifyer may be combined in an LM301 integrated circuit. In the embodiment illustrated where there are twenty receiver stations, a sampling rate of appoximately 10,000 samples per second has been found to be satisfactory. The Room Selector control logic 96 can operate as follows. Memory circuit 114 contains a plurality of memory registers any one of which may be addressed individually by inputting a receiver number which may vary from 0 to whatever number of receiver stations are associated with the Room Selector Unit. Data output 118 of the selected register is the number of the communication channel to which the addressed receiver station is to be connected. Type 7489 TTL integrated circuits or equivalents can be used for memory circuit 114. The receiver number is carried to line decoder 122 which may consist of two 7442 or TP4028 decoders to gate the solid state switches of the receiver station which has been selected. Similarly the number of the communication channel 118 goes to one of a plurality of decoders 124 and gates "on" their appropriate communication channel switch as illustrated by 90 and 108. In this manner when a receiver station number is inputted into the memory circuit, the receiver station will be electronically connected through its associated solid state switches to the appropriate communication channel. By sequentially varying the receiver station's number from 0 to cover the entire plurality of stations and then returning to 0, the sampling process is completed. Sequential counting is achieved by using memory scanning circuit 126 which consists of a binary counter circuit driven by a centrally located clock. The contents of memory circuit 114 are continuously being updated to reflect the requirements of telephone calls being placed to the receiver station and/or program inputs being selected for each receiver station. Update scanning circuit 128 which consists of a binary counter to indicate the number of the receiver station presently being updated selects one receiver station number and, in conjunction with channel scanning circuit 130 also a binary counter indicating the number of the channel presently being scanned to see whether it is being connected to the receiver station being updated, determines which communication channel that receiver station is to be connected to and loads that number into memory 114 that is associated for the particular receiver station being sought. The number of the receiver station being updated is incremented at a rate slower than the rate of change of the memory scanning circuit so that all receiver stations' memory data are updated. When a receiver station's number is selected by update scanning circuit 128, all the communication channels are checked by channel scanning circuit 130 to determine which one is to be connected to that receiver station. Since only a portion of the channels is used for telephone-to-room conversations, the channel scanning circuit scans the final destination of calls emanating on those channels by means of comparator 136 to determine whether one is trying to call a receiver station currently being updated. This information is carried by digital address lines 132 coming from the Central Processing Unit. If it is determined that one of these channels is calling that receiver station, then that channel number will be loaded into that receiver station's memory. If none of the telephone channels is trying to call the receiver station being updated, channel scanner circuitry 130 then scans program selection panel 134 to determine which of the audio sources the receiver station should be interconnected with. The program selection panel consists of a bank of a plurality of eight-positioned slide switches, a decoder to select the switch associated with the receiver station being updated and a decoder to select the channel presently being scanned. When the channel scanning circuit has detected the switch position selected by the slide switch, it receives a program acknowledge signal from the program selection panel. Comparator 136 is a TTL type digital comparator to detect if the identifying number of the receiver station being updated is identified by one of the called numbers which are multiplexed into digital room address lines 132, such detecting being indicated by a telephone acknowledge output 135. Having determined the correct channel number for the receiver station presently being updated, the channel number is loaded by means of loading logic 138, which is comprised of integrated circuits such as two or more TTL 7400 or equivalents, into memory circuit 114 and the updated scanning circuitry then proceeds to the next receiver station.

The system of this invention also has the flexibility to transmit time tones throughout the building in which it is used. To utilize such flexibility, one needs to wire a time clock which has a plurality of outputs and manually-adjustable indicators to set the times at which a tone will emanate. For example, hourly tones could be chosen and on the hour a time tone would be heard throughout the building. The Room Selector Unit may have circuitry within its control logic to override the program being carried so that the tone is heard at the Receiver Station. The system may have the further flexibility to include circuitry so that a plurality of telephones may be called at one time or a plurality of speaker stations may be utilized at the same time for a zone-paging function.

Figure 4:
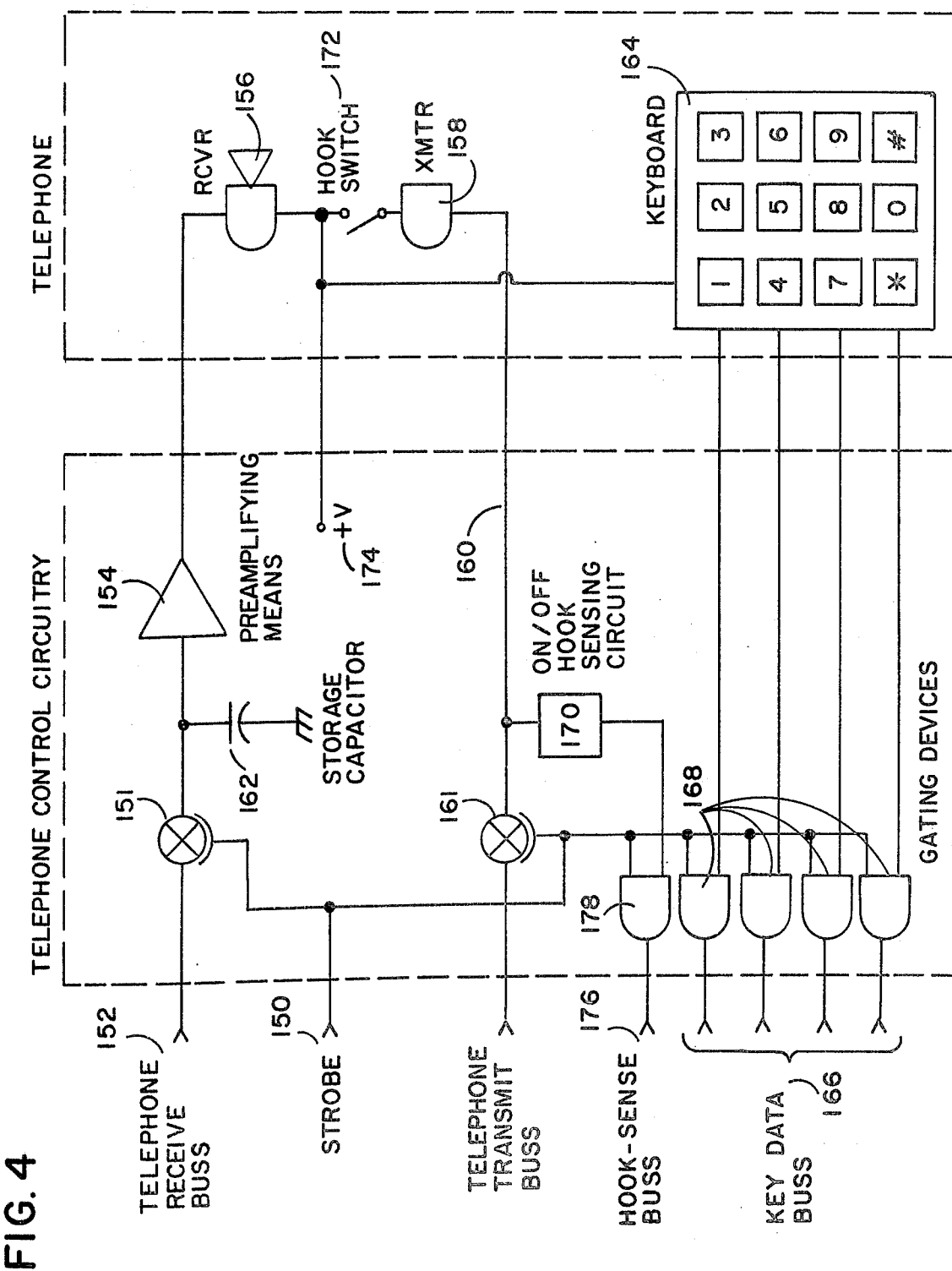
FIG. 4 is a schematic diagram in block format illustrating the telephone control circuitry.
Figure 5:
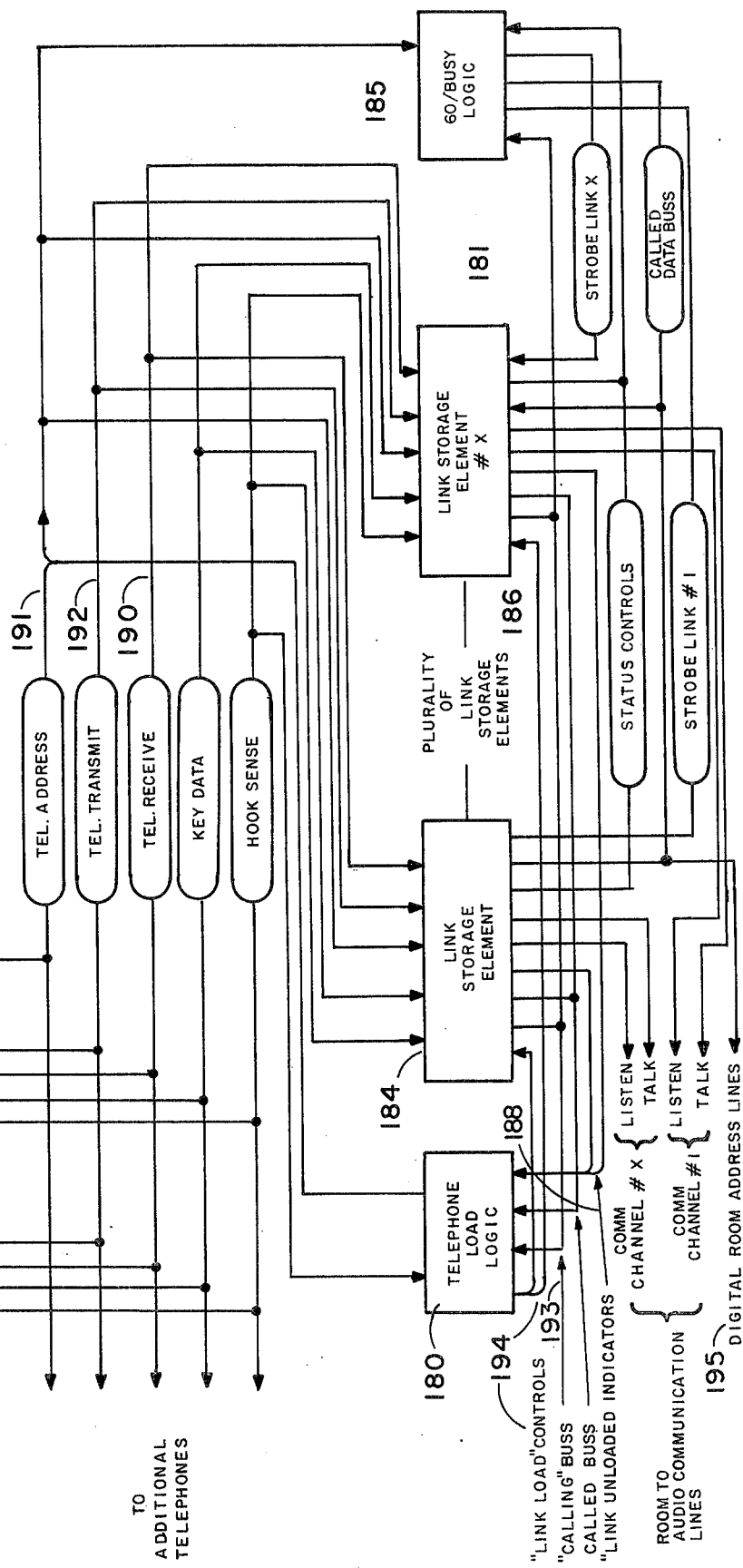
FIG. 5 is a schematic diagram in block format illustrating the Central Processing Unit and telephone control circuits.

FIG. 4 illustrates a typical embodiment of a telephone control circuitry system. When logic level "1" is applied to strobe input 150, switches 151 and 161 are gated "on" and the analog information on telephone receive buss 152, which is common to all telephone circuits, will be inputted to preamplifying means 154 which powers telephone receiver 156. Simultaneously, the analog information from transmitter 158 of the telephone is placed through switch 161 on telephone transmitter buss 160 which is also common to all telephone control circuits. When the logic level of strobe input 150 returns to "0", switches 151 and 161 are now gated off and the analog input to preamplifying means 154 is retained by storage capacitor 162 until the strobe is again returned to logic level "1". The telephone is also assumed to have a keyboard which may have a four-bit output as illustrated for placing calls. Such a keyboard can have a more than four-bit output or no-bit output whatsoever (as in a "touch-tone" system) as long as an equivalent means of call identification information is used. When the strobe is at logic level "1", the instantaneous output of keyboard 164 is connected to a four-bit key data buss 166 by means of strobe-activated gating devices 168. In reduction to practice of this system, TTL type 7401 open collector devices or their equivalents were utilized. On-off hook sensing device 170 or equivalent which can be a simple transistor with biasing resistors detects whether the telephone is on or off its hook by means of hook switch 172 in series with the telephone's transmitter 158 to positive voltage supply 174. When strobe logic level is "1", the sensing circuit's output is transferred to hook sense buss 176 by means of gate 178 as described above. An important point of the preceding description is that the various inputs and outputs of a telephone's control circuitry are adaptable to a "bussed connection", that is, a plurality of telephone control circuits can have all their respective inputs and outputs wired in parallel except the strobe and any one telephone can be connected to the buss line directly by raising its strobe to logic level "1" and there will be no interference or connection with other telephones. Interconnection of telephones and placement of telephone-to-telephone or telephone-to-room calls take place as follows as shown in FIG. 5 which illustrates schematically the Central Processing Unit and the telephone control circuits. Telephone load logic 180 continuously scans a plurality of telephones, two of which are illustrated by 187 and 189. This scanning is achieved by means of decimal counting circuit 300 in FIG. 7 which in this embodiment would count sequentially from 00 to 99. A two-digit telephone address number is outputted by telephone load logic 180 indicating the telephone presently being scanned. Strobe decoder 182 identifies the number of the scanned telephone and outputs a logic level "1" to that telephone's control circuit strobe input 183 thereby connecting that telephone to the various input and output busses. It is anticipated that this system can also use other methods of scanning the telephones besides the one discussed above which counts from 00 to 99. One other method to accomplish the above is by interrogating those telephones which are engaged in conversation and ignoring the ones that are not engaged. In one reduction to practice of this system, a tenstrobe decoder 182 was used as follows for up to ten telephones grouped numerically by their ten's digit. Within the ten strobe decoder, a 7442 TTL decoder was used to decode the one's digit from the telephone address and a 7486 integrated circuit was used to gate the 7442 TTL decoder active if the ten's digit agreed with a value selected manually on a thumb wheel switch on the strobe decoder for that group of 10 telephones. If the presently scanned telephone is not engaged in conversation, no action occurs and the telephone's address is incremented on the next system-clock transition at 302 in FIG. 7. If the scanned telephone has gone off hook since the last interrogation as sensed by the hook sense buss 308 and calling buss 310 in FIG. 7 and is not being called by another telephone as detected by a called buss 312 in FIG. 7, the telephone address of that telephone is loaded into the calling register of an available link storage element 184 by means of an activated load strobe 194 to that storage element. Telephone load logic 180 determines which link storage element is available by continuously scanning link unloaded indicators 188 (one for each link) until one is found in the unloaded state, such scanning being achieved by counter 304 in FIG. 7 gated by the output of an addressed data multiplexer 306. After a telephone's address has been loaded into the calling register of a link storage element, whenever that telephone is addressed by telephone load logic 180, the telephone will receive over telephone receive buss 190 analog information from the party being called (indirectly through the link storage element) and will transmit over telephone transmit buss 192 its microphone analog information to the called party (also indirectly through the link storage element) until the call is completed. If the telephone load logic addresses a telephone which is off hook or in conversation with another party, link load function 194 is inhibited, but the called telephone still receives and transmits data over the telephone talk and receive busses through the link storage element which has the address of that calling party in its calling register.

FIG. 6 illustrates a schematic diagram of a typical link storage element. When telephone load logic 180 in FIG. 5 determines that a telephone's address is to be loaded into a link storage element, link load control 200 of that link storage element is made "active" and the telephone address is loaded into calling register 202 of that link storage element. Calling register 202 consists of several flipflops. This action also inputs to status indicator 204 which indicates to the telephone load logic that the link is no longer available for loading. Calling Comparator 206 compares the contents of the calling register at any instant in time to telephone address 208 input by the telephone load logic. When these two are equal indicating that the calling telephone has been connected to key data 210, hook sense 212, telephone transmit 214, and telephone receive buss 216, the output of calling comparator 206 activates the following steps. First the data on key data buss 210 is loaded into key data storage register 218. A signal to the calling telephone is transmitted from buffer amplifier 2 220 through switch S2 222. The signal from the calling telephone is loaded onto storage capacitor 224 and into buffer amplifier 1 226 through switch S1 228. Calling buss 193 in FIG. 5 is pulled "low" by open collector gate device 236 indicating to the telephone load logic that the load function should be inhibited to this particular link storage element.

Due to the high counting speed of telephone address 208, the sampling rate is such that the output of buffer amplifier 1 226 is an accurate representation of the analog signals at the microphone of the calling telephone. Similarly, the contents of key data storage device 218 are an accurate representation of the calling telephone's keyboard outputs. As different keys are touched on the keyboard by the person utilizing the calling telephone, interdigital identifier 230 which may consist of a simple Nand gate or equivalent recognizes new data and after a time delay, the digits are loaded into three-digit shift register 232. Once three digits are loaded, that is the number of the called party. A digit system with any number of digits can be utilized with the hardware adjusted accordingly, but in the embodiment illustrated, a three-digit numbering system was employed. Also in the embodiment illustrated, Room Selector Unit receiver stations are identified by straight three-digit numbers and individual telephones are identified by two-digit numbers. However, in the practical operation of this invention, any number of digits can be employed for either type of identification.

When the called telephone is scanned, its telephone address numbers appear at the called comparator 234 and, assuming the hundred's digit equals the number detected by prefix identifier 235, called comparator 234 output becomes active and the following steps take place. First the called telephone's microphone output on telephone transmit buss 214 is loaded through switch S4 238 onto holding capacitor 240 and into buffer amplifier 2 220. Then the calling telephone's microphone signal which had been previously loaded into buffer amplifier 1 226 is connected through switch S3 242 onto telephone receiving buss 216 and thus to the called party's receiver.

An important feature of this system is that only one telephone need be addressed at a time whether it is a telephone placing the call or the party being called. By means of the link storage element and the toggling action between switches S1, S2, S3, and S4, only one telephone need be connected at a time and the information will be held until the other party engaged in the conversation is connected. The significant difference between the system of this invention and previously existing systems is that previous systems have required the interconnection of both the calling and the called party at the same instant in time, which interconnection necessitates the use of two sets of addressing cables, one indicating the number of the calling party, the other indicating the number of the called party and necessary switching devices to connect both cables to a common communication line. The present invention requires only one set of addressing cables and fewer switching devices than previous systems.

An aternate approach to each separate link element having its own register is for the registers of the link elements to be combined into one integrated circuit which is commonly called a rotating memory. Therefore, instead of scanning each link at a time, all eight links are scanned by a rotating memory. This rotating memory integrated circuit actually contains a register for each link, but it scans all of the registers inside the rotating memory integrated circuit and the outputs come out one at a time. The device of this invention can be adapted to use such a rotating memory and it will have benefits in some systems as it is a way of saving duplication of hardware.

An important feature of this invention is the inclusion of a circuit to monitor the placement of calls and generate an apropriate busy or go status control to the status flipflop, a plurality of which are in status indicator 204 of each link storage element to indicate the progression of the call from original placement to completion. The go-busy logic 185 in FIG. 5 which controls a portion of the flipflops in status indicator 204 periodically places each link storage element's called number (i.e., the contents of shift register 232) by means of strobing the called data gating devices 244 onto a common called data buss 246 also seen as 181 in FIG. 5 and monitors the information to see whether any two links are calling the same party. The contents of the shift registers for each link are compared against the contents of the other links' shift registers by means of comparator integrated circuits. In reduction to practice, type 7475 were used for temporary holding registers and type 7486 were used for actual comparison. If two links are calling the same party, a busy tone is switched onto one of the link storage element's buffer amplifier 2 resulting in a busy signal to the calling party from a tone generator 223 switched by a flipflop in status indicator 204. The go-busy logic 185 in FIG. 5 also monitors telephone address 191 in FIG. 5 (also seen as 208 in FIG. 6) and calling buss 193 in FIG. 5 (also seen as 236 in FIG. 6) to determine whether a called party is already placing a call, and if so, generates the appropriate busy signal to the calling party. The busy, dial, and ring tones are generated at tone generator 223 which is controlled by status indicator 204. An additional feature to be noted is the periodic strobing of the called data onto called data buss 246 in effect placing the signals on the digital room address lines 32 in FIG. 1, also seen as 195 in FIG. 5, to the Room Selector Units as previously described. Clearing of status indicators 204 at the end of a call where the flipflops contained therein are reset to an inactive state within a link storage element is achieved by monitoring hook-sense register 231 and off-hook sensing circuit 248 on the output of buffer amplifier 2 220. The hook sense register is a flipflop whose output will indicate the status of the calling party's hook switch. Loading of this data from the hook sense buss is controlled by calling comparator 206. The on-off hook sense circuit 248 is a transistor circuit biased wth resistors.

The system of this invention is also compatible to be used with an enunciator. An enunciator is a device which monitors the talk back line from the receiver stations when they are in the mode of listening to audio sources and normally not using their talk back lines. For example, when a teacher in a classroom wants to call in, he depresses a call-in button which puts a special signal on his talk line. The enunciator detects that signal and indicates on a display unit the number of the receiver station calling, and the individual at the location of the display unit can then call back that teacher in his classroom. If a series of receiver stations are calling in at the same time, each receiver station number will flash on the display unit in sequence until the individual at the location of the display unit has called each receiver station back. As each receiver station is called back, its receiver station number disappears from the flashing sequence on the display unit.

The system of this invention also has the ability to use touch-tone telephones that eliminate the need for digital key data busses and key data storage. Such a system would need an amplifier taking the audio signals and a touch tone decoder to generate calling data, such amplifier and decoder to be located within the link storage elements.

It is anticipated that the system of this invention will have the ability to interface with the Bell System. One manner of accomplishing this interfacing is to replace one of the telephones in this system with a connecting device purchased from the Bell System which is wired into an outside telephone line. Then, when calling an outside line, instead of dialing an inside number, one dials the number of the outside telephone line. Instead of talking to a telephone at that number, one is connected to the dial tone of the outside line. One may then call by the touchtone system or by having a coding device included in the system to generate and send over the wires the tones necessary to call another party on the Bell System.

While the apparatus of this invention has been illustrated by particular embodiments, it is to be understood that such embodiments are only intended to be illustrative of the present invention and numerous other arrangements may be devised by those skilled in the art without departing from the spirit and scope of this invention.

I claim:

1. Apparatus for simultaneously carrying a plurality of audio signals over a transmission line between a central location and a plurality of remote locations comprising:

said transmission line;

an address line intercoupling at said central location a central processing unit and at least one remote location selecting means associated with a plurality of said remote locations for carrying digital address signals for designating respective remote locations to exchange audio signals with said transmission line;

each of said remote locations having remote transceiving means which are coupled to said transmission line through one of said remote location selecting means which further includes means responsive to a predetermined digital address signal on said address line for enabling a designated remote transceiving means to exchange audio signals with said transmission line;

said remote location selecting means further including analog storage means for storing an electrical analog signal and means for selectively coupling said analog storage means to said transmission line;

each of said remote transceiving means including means for coupling said analog storage means to a remote transducing means for transducing acoustical and electrical energy from one form to the other;

said central processing unit further including remote location designating means for designating to said remote location selecting means over said address line certain of said remote transceiving means to be enabled during predetermined time intervals which correspond to respective time-spaced communication channels for exchanging intelligible audio signals between said remote transducing means associated with said enabled remote transceiving means and said transmission line.

2. Apparatus in accordance with claim 1 wherein said central processing unit includes a plurality of link storage means for association with a respective one of said communication channels for storing analog signals for transmission over the associated channel; and means for associating a remote transceiving means with a respective link storage means whereby the latter transceiving means may exchange signals through the respective link storage means over the associated channel;

each of said link storage means being associatable with any of said remote transceiving means.

3. Apparatus in accordance with claim 2 wherein said plurality of remote transceiving means comprise:
a plurality of receiver stations; and
a plurality of telephone units.

4. Apparatus in accordance with claim 3 wherein said remote location selecting means include at least one room selector unit coupled to said receiver stations and a plurality of telephone control circuits coupled to said plurality of telephone units.

5. Apparatus in accordance with claim 4 further including
a plurality of audio sources at said central location intercoupled with said receiver stations through said room selector units; and
means within said room selector units for selecting any of said audio sources for transmission to distinct receiver stations.

6. Apparatus in accordance with claim 5 wherein said transmission line is comprised of:
telephone communication lines intercoupling said plurality of telephone units through telephone control circuitry to telephone audio lines connected to said central processing unit;
room telephone audio lines coupling said central processing unit to said room selector unit;
audio source program lines coupling said audio sources to said room selector unit; and
audio output signal lines coupling said room selector unit to its associated receiver stations.

7. Apparatus in accordance with claim 6 wherein said link storage means comprise:
a plurality of link storage elements located within said central processing unit.

8. Apparatus in accordance with claim 7 wherein said room telephone audio lines comprise:
a transmit buss;
a receive buss;
means whereby each of said telephones' receivers is coupled to said receive buss;
means whereby each of said telephones' transmitters is coupled to said transmit buss; and wherein said communication channel and link storage element comprises:
a first and second switch, one pole of each attached to said transmit buss, the second pole of said first switch being attached to a line including a first storage capacitor and a first buffer amplifier; the second pole of said second switch being attached to a line including a second storage capacitor and a second buffer amplifier;
a third and fourth switch, one pole of each attached to said receive buss, the other pole of said third switch being attached to the line from said first buffer amplifier; and the second pole of said fourth switch being attached to the line from said second buffer amplifier;
means for closure of said first and fourth switches and opening of said second and third switches simultaneously and alternately closing said second and third switches and opening said first and fourth switches so that when said first and fourth switches are closed, information from the calling telephone's transmitter is stored on said first capacitor and information previously stored on said second capacitor is fed through said second buffer amplifier through closed fourth switch on said receive buss to the calling telephone's receiver; alternately, said first and fourth switches and said second and third switches close so that the information on said first capacitor is fed through said first buffer amplifier and through said third switch onto said receive buss and to the called telephone's receiver and the transmitted information from the called telephone is carried along the transmit buss through said second switch onto said second storage capacitor whereby the signals are transmitted from the calling telephone to the called telephone and vice versa through said link storage element, said process being repetitive whereby signal exchanges between the calling and called telephone are accomplished.

9. Apparatus in accordance with claim 8 wherein the opening and closing of said switches within said link storage element occur during said time intervals for exchanging audio signals between said remote locations.

10. Apparatus in accordance wth claim 9 wherein said time intervals occur at a frequency rate in excess of the minimum theoretical time interval for intelligible communication.

11. Apparatus in accordance with claim 10 further including means for transmission of high frequency signals between said central processing unit, said room selector unit and said telephone control circuitry; and
means for transmission of low frequency signals between said room selector units and said receiver stations and between said telephone control circuitry and said telephones.

12. Apparatus in accordance with claim 11 wherein said room selector unit further includes:
a plurality of input communication channels;
a plurality of input switches, each located at one of said input communication channels;
a plurality of receiver station output channels;

a plurality of output switches, each located at one of said receiver station output channels;
a room talk buss and a room listen buss communicatively associated with said input and output switches;
a control logic located within said room selector unit;
means by which said control logic aternately opens and closes said input and output switches so that a selected input channel may be interconnected to a selected receiver station output channel during said time intervals for exchanging said audio signals between said remote locations.

13. Apparatus in accordance with claim 12 wherein said control logic further includes
a program selection panel; and
means within said program selecting panel for manually directing individual audio programs on said input communication channels to selected receiver stations.

14. Apparatus in accordance with claim 3 wherein said central processing unit and telephone control circuitry may be operated independently from said room selector units and vice versa.

* * * * *